(12) United States Patent
Copin et al.

(10) Patent No.: US 11,940,328 B2
(45) Date of Patent: Mar. 26, 2024

(54) SYSTEM AND METHOD FOR CONTROLLING THE COLOUR OF A MOVING ARTICLE

(71) Applicant: ODESYO, Montpellier (FR)

(72) Inventors: Philippe Copin, Aigues-Mortes (FR); Dominique Martin, St Gély du Fesc (FR)

(73) Assignee: VEORIA, Montfort le Gesnois (FR)

( * ) Notice: Subject to any disclaimer, the term of this patent is extended or adjusted under 35 U.S.C. 154(b) by 3 days.

(21) Appl. No.: 17/762,578

(22) PCT Filed: Jul. 21, 2020

(86) PCT No.: PCT/EP2020/070596
§ 371 (c)(1),
(2) Date: Mar. 22, 2022

(87) PCT Pub. No.: WO2021/058172
PCT Pub. Date: Apr. 1, 2021

(65) Prior Publication Data
US 2022/0404203 A1 Dec. 22, 2022

(30) Foreign Application Priority Data

Sep. 23, 2019 (FR) ...................................... 1910487

(51) Int. Cl.
*G01J 3/50* (2006.01)
*G01J 3/02* (2006.01)
*G01N 21/25* (2006.01)

(52) U.S. Cl.
CPC ............. *G01J 3/501* (2013.01); *G01J 3/0208* (2013.01); *G01N 21/25* (2013.01)

(58) Field of Classification Search
CPC .. G01J 3/501; G01J 3/0208; G01J 3/46; G01J 3/50; G01N 21/25; G01N 21/251
(Continued)

(56) References Cited

U.S. PATENT DOCUMENTS 8,942,471 B2 * 1/2015 Schulz ................... G03B 33/04
382/162
2002/0196437 A1 * 12/2002 Tandon ................... G01J 3/513
356/320
(Continued)

FOREIGN PATENT DOCUMENTS

EP 1591761 A2 11/2005
EP 2778635 A1 * 9/2014 ............. G01C 11/02
(Continued)

OTHER PUBLICATIONS

International Search Report issued in PCT/EP2020/070596 dated Dec. 2, 2020 (8 pages).
(Continued)

*Primary Examiner* — Michelle M Iacoletti
*Assistant Examiner* — Noah J. Haney
(74) *Attorney, Agent, or Firm* — Osha Bergman Watanabe & Burton LLP

(57) ABSTRACT

The present invention relates to a color control system for controlling, in real time, the color of an article positioned on a moving carrier. The system comprises: an illuminating device configured to illuminate the moving article in successive illuminating cycles, each illuminating cycle comprising successively generating, at a given rate, a given number of lines of light having distinct spectral bands the lines of light being substantially perpendicular to the direction of movement; a detecting device configured to detect the light back scattered by the article successively illuminated by each of the lines of light, such as to generate for each dot of a given number of dots of an observation strip perpendicular to the direction of movement, a number of signals corresponding to the light back scattered by the dot; and a processing unit configured to determine at least one value representative of the color of the dot.

10 Claims, 8 Drawing Sheets

(58) Field of Classification Search
USPC .......................................................... 356/402
See application file for complete search history.

(56) References Cited

U.S. PATENT DOCUMENTS

| | | | |
|---|---|---|---|
| 2007/0139735 A1 | 6/2007 | Shakespeare et al. | |
| 2007/0252990 A1 | 11/2007 | Grueger | |
| 2009/0296085 A1* | 12/2009 | Mestha | G01J 3/02 |
| | | | 250/461.1 |
| 2010/0044441 A1 | 2/2010 | Cohen et al. | |
| 2013/0201244 A1* | 8/2013 | Benedicto | G01J 3/027 |
| | | | 347/19 |
| 2018/0284033 A1* | 10/2018 | Legros | G01N 21/8901 |
| 2020/0182848 A1* | 6/2020 | Su | G01N 21/31 |

FOREIGN PATENT DOCUMENTS

| | | | | |
|---|---|---|---|---|
| EP | 2881730 A1 * | 6/2015 | | G01J 3/06 |
| EP | 2881730 A1 | 6/2015 | | |
| EP | 3677884 A2 | 7/2020 | | |
| WO | 94/25838 A1 | 11/1994 | | |
| WO | 2013/120956 A1 | 8/2013 | | |
| WO | WO-2014207675 A1 * | 12/2014 | | B07C 5/342 |

OTHER PUBLICATIONS

Written Opinion of the International Searching Authority issued in PCT/EP2020/070596 dated Dec. 2, 2020 (9 pages).
Third Party Observation for European Application No. 20753682.2, dated Aug. 10, 2022 (6 pages).

* cited by examiner

SYSTEM AND METHOD FOR CONTROLLING THE COLOUR OF A MOVING ARTICLE

The present invention relates to control of the color of a moving article and is especially applicable to control of color in the field of industrial printing.

PRIOR ART

Driven by new digital technologies, industrial printing is increasingly being adopted in many sectors such as the packaging sector, the textile sector, the automotive sector, the cosmetics sector, the pharmaceutical sector, the chemical sector, the food-processing sector, the household-goods sector, etc.

Print quality and the accuracy of the color printed are essential to avoiding customer dissatisfaction; thus, the technique used to control the conformity of printed colors is instrumental in the competitiveness of new users of digital printing technologies, who are further seeking to automate the control of print quality in industrial processes. The rejection/acceptance threshold of automatic control must be positioned between sub-quality, which leads to delivery of non-compliant objects and costly returns, and over-quality, which leads to rejection of objects that would be acceptable to the customer and, once again, extra costs.

A human control of the printed color is an easy way of getting close to the validation criteria of the customer; however, an operator requires a lot of experience, i.e. an control specialist must be trained, to satisfactorily control color. Moreover, the subjectivity of control by an operator and visual fatigue make human controls unreliable or unrepeatable.

Automatic color control methods have thus been developed.

For example, color control based on the use of RGB cameras (RGB being the acronym of red, green, blue) is known. Incident white light illuminates the printed article to be controlled and the reflected light is analyzed by the RGB camera in at least 3 spectral bands in the red, green, and blue. Such an automatic control of color is for example described in patent EP 2172171, in which a system for controlling the color of a printed image on a moving printing web is described.

From the RGB components, it is possible to determine a "color profile" (for example one determined in a CIE 1976 L*a*b* space) that can be compared with a reference color profile. However, the light that illuminates colored surfaces contributes to the formation of the light spectrum perceived by the eye. Two surfaces may seem identical under a given light and appear different colors under a different light. This is the case for metamers the physical spectrum of which differs but which have identical RGB values under a given light. Their color changes if the spectrum of the illuminating light changes.

Thus, control of color by means of an RGB camera permits only a relative measurement of color, useful for measuring non-conformity but requiring a prior calibration that has to be redone if external conditions change.

It is also known to use a spectrophotometer to automatically control the color. A spectrophotometer allows a complete analysis of the spectrum of the light reflected by an article illuminated with white light. More precisely, it allows, with respect to an RGB camera, the energy bands of the spectrum to be converted into an absolute measurement in the L*a*b* space that is independent of the profile of the source, and thus "true color" to be controlled.

However, spectrophotometer-based control is carried out by sampling printed solids with a minimum area of 5 mm×5 mm. Therefore only uniform areas (same color, no gradient) can be controlled, this making it difficult to control the quality of printed characters and more generally of any area the size of which is smaller than 5 mm×5 mm.

Other methods have been disclosed (see for example WO 94/25838 or US 2007/0139735) that comprise illuminating a sample to be analyzed by means of beams of different wavelengths. However, in the described methods, only one or more point-like areas of a sample can be analyzed.

One objective of the present description is to provide a system for controlling the color of a moving article that especially allows an absolute measurement of the color, in real time, and over the entire area of a moving article.

SUMMARY OF THE INVENTION

In the present description and in the claims that follow, the term "to comprise" is synonymous with (i.e. means the same as) "to include" and "to contain", and is inclusive or open and does not exclude other elements that are not described or illustrated. Furthermore, in the present description, the term "about" is synonymous with (i.e. means the same as) a margin of 10%, and for example of 5%, below and/or above the respective value.

According to a first aspect, the present description relates to a color control system for controlling, in real time, the color of an article on a carrier moving in a given direction of movement, comprising:

an illuminating device configured to illuminate said moving article in successive illuminating cycles, each illuminating cycle comprising successively generating, at a given frequency, a given number N of lines of light having distinct spectral bands, N≥4, said lines of light being substantially perpendicular to the direction of movement, the set of N lines of light generated during one illuminating cycle defining, on the moving article, an illuminating strip of given dimension in the direction of movement;

a detecting device configured to detect, during each illuminating cycle, the light backscattered by the article successively illuminated by each of said lines of light, such as to generate, during each illuminating cycle, for each dot of a number of given dots of an observation strip perpendicular to the direction of movement, a number N of signals corresponding to the light backscattered by said dot in each of the spectral bands, respectively;

a processing unit configured to determine, for each of the dots of the observation strip and on the basis of said N signals, at least one value representative of the color of said dot.

According to one or more examples of embodiment, the system is configured to control articles arranged on a scrolling carrier and the movement is a translational movement; the direction of movement is thus parallel to the direction of translation. According to one or more examples of embodiment, the system is configured to control articles arranged on a rotating carrier, for example a rotating cylinder; the direction of movement is then perpendicular to a generatrix of the cylinder.

In the present description, by "backscattered light" what is meant is all the light re-emitted by the article when it is illuminated by a line of light, whether this be through reflection, scattering or a combination of the two.

The color control system thus described especially allows, with respect to the known prior-art systems, an absolute measurement of the color of the entire area of the article to be obtained in real time, and allows a differentiation between colors better than or equal to that achievable with the naked eye.

According to one or more examples of embodiment, said at least one value representative of the color comprises coordinates defined on a Lab sphere defining a "hue angle" and a lightness, for example the so-called "CIE 1976 L*a*b*" sphere adopted by the International Commission on Illumination (CIE) in 1976 and defined according to the standard ISO 11664-4.

According to one or more examples of embodiment, said at least one value representative of the color comprises a color difference (or distance between colors) determined with respect to a reference object. The reference object is, for example, an article ("standard") of the same type as the one the color of which it is sought to control, or a reference file comprising the data that permitted printing.

The color difference is for example determined in the CIE L*a*b* space, for example using either of the following formulae: that of $\Delta E76$, also called "Delta 1976", or that of $\Delta E00$, also called "Delta 2000", these two formulae being defined in the standard ISO 12647-2 version 2013. In practice, the $\Delta E76$ formula calculates a Euclidean distance between two colors defined in the CIE L*a*b* space and the $\Delta E00$ formula takes into account the conditions of observation (such as for example differences in the sensitivity of the cones of the human eye as a function of color and luminosity) to get even closer to human perception.

According to one or more examples of embodiment, the number N of lines of light of distinct spectral bands is comprised between 4 and 36, and advantageously between 8 and 12. The applicant has shown that, in this range, a good compromise is obtained between a number of distinct spectral bands sufficient to achieve good accuracy in the characterization of the color and a low measurement time for the control.

According to one or more examples of embodiment, the illuminating device comprises a plurality of light sources configured to successively emit one or more beams in each of said spectral bands, and one or more optical elements configured to generate, from said one or more beams emitted in each of said spectral bands, a line of light in said spectral band.

Said one or more optical elements for example comprise one or more lenses, including for example one or more cylindrical lenses, and/or one or more reflective elements, especially for concentrating the illuminating luminous power.

According to one or more examples of embodiment, said one or more optical elements further comprise a diffuser for increasing the uniformity of each of the lines of light.

Said one or more optical elements aim to generate, from the light emitted by said one or more light sources in each of the spectral bands, a line of light perpendicular to the direction of movement, and of given width in the direction of movement.

According to one or more examples of embodiment, said one or more optical elements are configured to generate the plurality of N lines of light corresponding to the plurality of spectral bands substantially in the same position on the carrier of the article.

According to one or more examples of embodiment, the frequency of formation of the lines and/or the optical device for generating the lines of light are configured such that said N lines of light generated on said moving article during an illuminating cycle are juxtaposed.

According to one or more examples of embodiment, the frequency of formation of the lines and/or the optical device for generating the lines of light are configured such that said N lines of light generated on said moving article during an illuminating cycle are at least partially superposed.

According to one or more examples of embodiment, the one or more illuminating sources comprise a set of multiplexed point sources, for example light-emitting diodes (LEDs) or laser diodes.

According to one or more examples of embodiment, the detecting device comprises at least one fixed sensor and one or more optical elements configured to generate, during each cycle, an image of each line of light backscattered by the article on said sensor.

According to one or more examples of embodiment, said at least one sensor is monochrome.

According to one or more examples of embodiment, said at least one sensor is linear, i.e. formed of a line of photosensitive elements ("pixels").

For example, said at least one sensor comprises a CCD camera or a CMOS camera, comprising for example between 4096 (4 k) and 16384 (16 k) photosensitive elements with a pitch of 3.5 μm.

According to one or more examples of embodiment, the dimension of the observation strip in a direction parallel to the direction of movement is comprised between 0.1 mm and 1 mm, advantageously between 0.1 mm and 0.7 mm, and for example between about 0.1 mm and about 0.5 mm.

According to one or more examples of embodiment, the dimensions of a dot of the observation strip are substantially identical in the direction of movement and in the transverse direction (perpendicular to the direction of movement). In practice, the dimension of a dot in the direction of movement (or "longitudinal resolution") is equal to the dimension of the observation strip in the direction of movement, and the dimension of a dot in the transverse direction (or "transverse resolution") is given by the dimensions of the photosensitive elements of the one or more sensors. Thus, to obtain an identical resolution in both directions, the signal generated by a plurality of adjacent photosensitive elements, the dimension of which in one direction is usually a few tens of microns, will possibly be averaged.

According to one or more examples of embodiment, the observation strip is defined by the illumination strip.

According to a second aspect, the present description relates to a color control method for controlling the color of an article on a carrier moving in a given direction, comprising:
  illuminating said moving article, by means of an illuminating device and in successive illuminating cycles, each illuminating cycle comprising successively generating, at a given frequency, a given number N of lines of light having distinct spectral bands, N≥4, said lines of light being substantially perpendicular to the direction of movement, the set of N lines of light generated during an illuminating cycle defining, on the moving article, an illuminating strip of given size in the direction of movement;
  detecting, by means of a detecting device, during each illuminating cycle, the light backscattered by the article successively illuminated by each of said lines of light, such as to generate, during each illuminating cycle, for each dot of a number of given dots of an observation strip perpendicular to the direction of movement, a number N of signals corresponding to the light backscattered by said dot in each of the spectral bands, respectively;

determining, for each of the dots of the observation strip and on the basis of said N signals, at least one value representative of the color of said dot.

According to one or more examples of embodiment, said at least one value representative of the color comprises a hue angle and a lightness defined on a Lab sphere, for example the so-called "CIE 1976 L*a*b*" sphere.

According to one or more examples of embodiment, said at least one value representative of the color comprises a color difference (or distance between colors) determined with respect to a reference object.

According to one or more examples of embodiment, the determination of said at least one value representative of the color comprises one or more steps of computing averages, including for example a step of computing the weighted average of signals acquired via detection of a plurality of lines of light of same spectral band in consecutive illuminating cycles. Computation of such a weighted average allows the accuracy of the characterization of the color to be improved, to the detriment of longitudinal resolution.

According to one or more examples of embodiment, the controlling method comprises a prior step of calibrating the detecting device. For example, the calibration is carried out using a calibrated test pattern.

BRIEF DESCRIPTION OF FIGURES

Other advantages and features of the invention will become apparent on reading the description, which is illustrated by the following figures.

DETAILED DESCRIPTION OF THE INVENTION

In the following detailed description of forms of embodiment of the present invention, many specific details are described in order to provide a more thorough understanding of the present description. However, it will be obvious to anyone skilled in the art that the present description can be implemented without these specific details. In other cases, well-known features have not been described in detail to avoid needlessly complicating the description.

Figure 1:
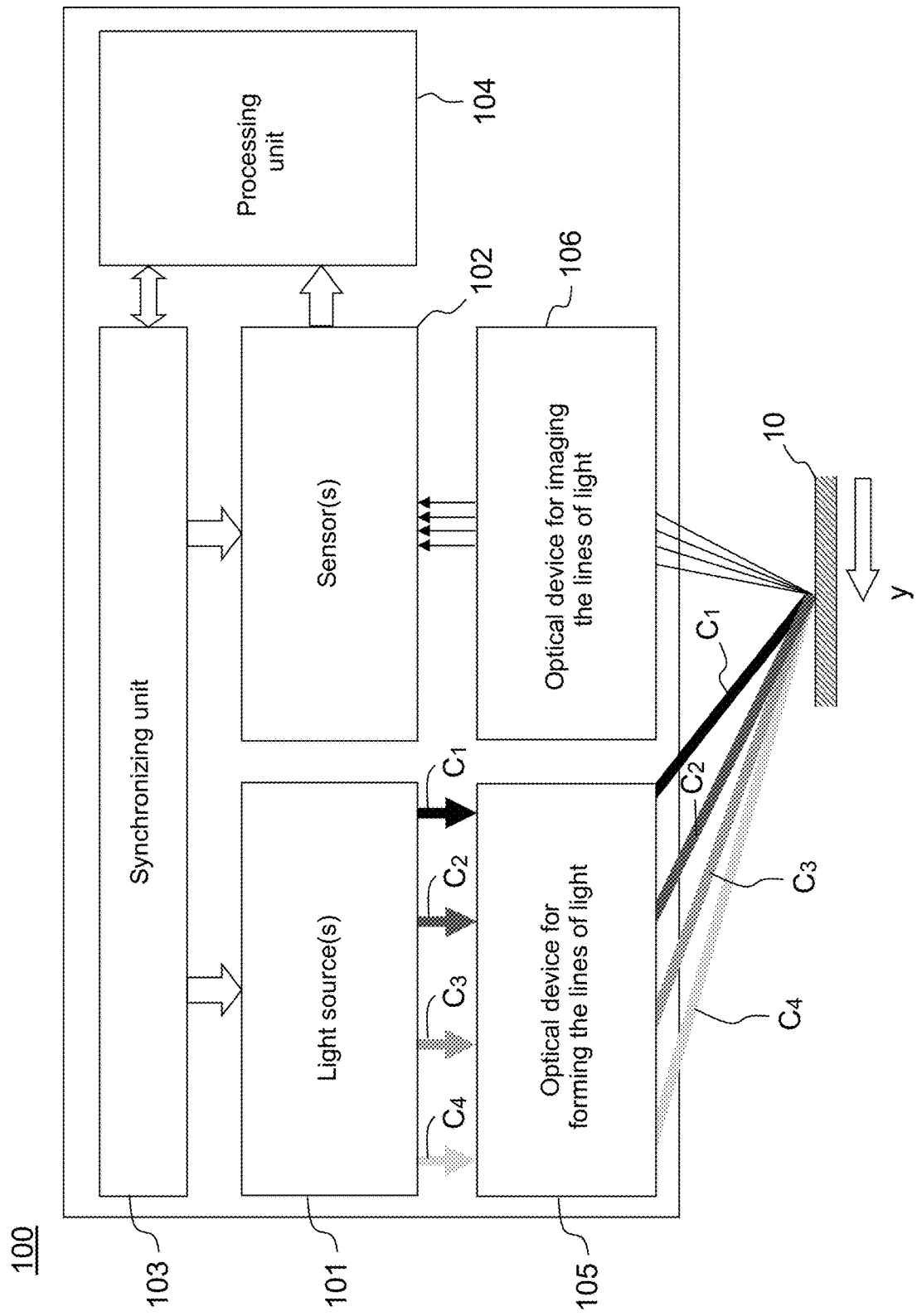
FIG. 1 shows a functional schematic of an example of a color control system according to the present description.

FIG. 1 shows a functional schematic of an example of a system 100 for controlling the color of an article 10 arranged on a moving carrier, according to the present description.

The color control system 100 comprises an illuminating device with one or more light sources 101 and an optical device 105 comprising one or more optical elements for generating lines of light from light beams generated by said one or more light sources. The color control system 100 moreover comprises a detecting device with at least one sensor 102 and a second optical device 106 comprising one or more optical elements for generating images of the lines of light on said at least one sensor. The color control system 100 further comprises, in this example, a unit 103 for synchronizing the illumination and detection with the movement and a processing unit 104.

Figure 2A:
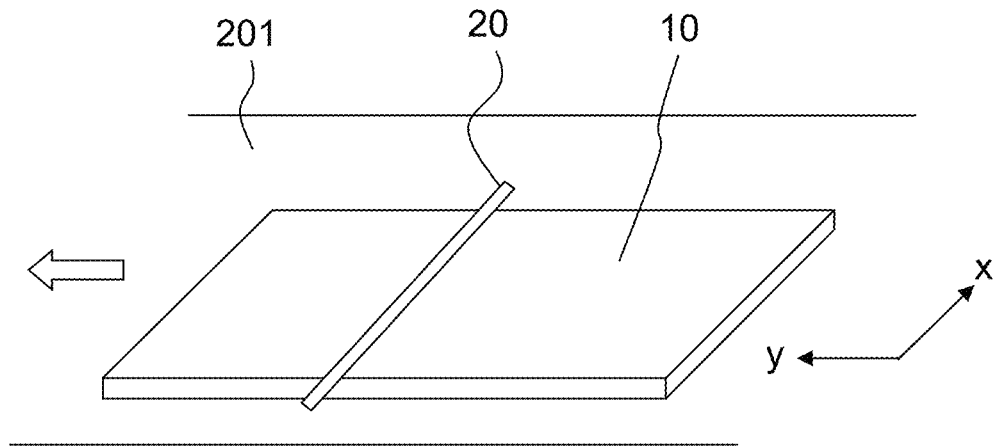
FIG. 2A illustrates an example of an object on a scrolling carrier, for the implementation of a color control method according to the present description.

As illustrated in FIG. 2A, the article 10 may be arranged on a scrolling carrier 201.

The movement is then a translation in a direction Y parallel to the direction of translation.

This configuration is for example applicable to an article such as a web of paper, fabric, or plastic film output by a printing machine, but also to bulk articles such as rectangular boxes, etc.

Figure 2B:
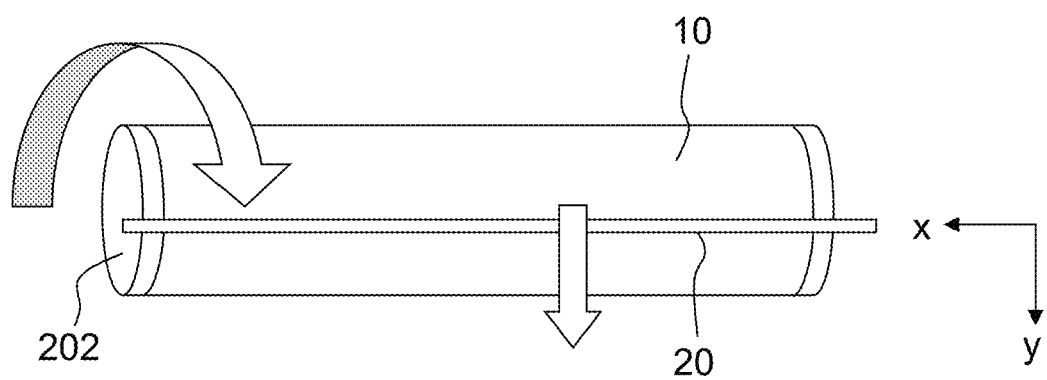
FIG. 2B illustrates an example of an object on a rotating carrier, for the implementation of a color control method according to the present description.

As illustrated in FIG. 2B, the object 10 may also be arranged on a rotating carrier 202, a cylindrical carrier for example. The direction of movement Y is then perpendicular to a generatrix of the cylinder.

This configuration is for example applicable to an article such as a distribution tube or a printed cylindrical box.

The illuminating device is configured to successively generate, on the moving article, a plurality of illuminating cycles. Each illuminating cycle comprises successively generating, at a given frequency, a given number N of lines of light containing distinct spectral bands, N≥4. Each line of light results from shaping, by the optical device 105, of an illuminating beam, emitted by said one or more sources 101, of given spectral band or "color", which colors have been referenced $C_1$, $C_2$, $C_3$, $C_4$ in the example of FIG. 1.

The detecting device 102, 106 is for its part configured to detect, during each illuminating cycle, the light backscattered by the article successively illuminated by each of said illuminating lines.

The lines of light generated by said one or more light sources 101 and the optical device 105 are substantially perpendicular to the direction of movement. They define, during an illuminating cycle, an illuminating strip the width of which (or dimension of which in the direction of travel, i.e. in the direction of movement) depends on the width of each line of light, on the frequency of formation of the lines of light during an illuminating cycle and on the speed of movement of the carrier (speed of translation in the example of FIG. 2A or tangential speed in the example of FIG. 2B).

Figure 3:
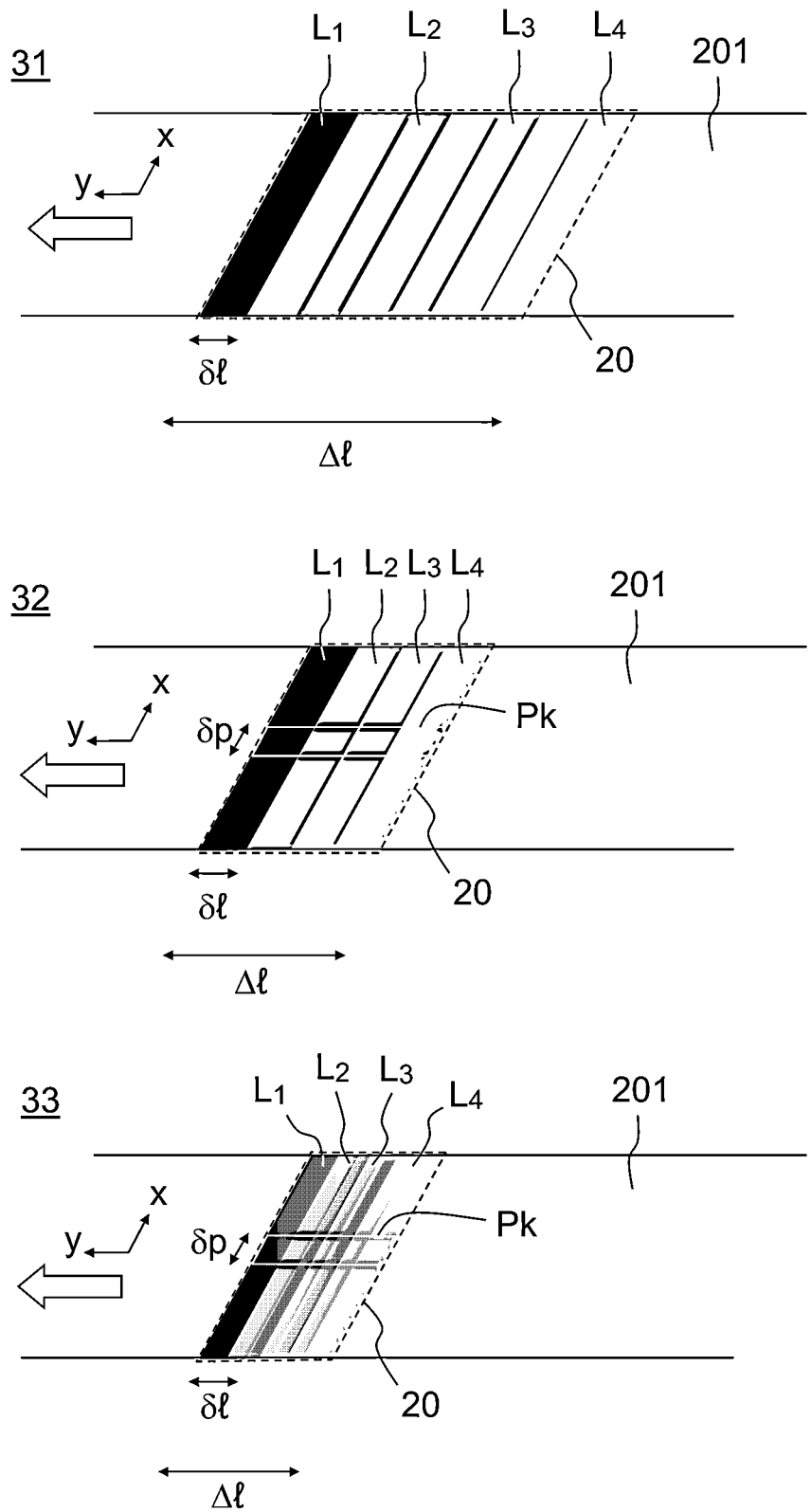
FIG. 3 shows functional schematics of examples of lines of light, during an illuminating cycle, in a color control method according to the present description.

FIG. 3 thus illustrates 3 examples (31-33) of formation of lines of light $L_1$-$L_4$, corresponding to the beams $C_1$-$C_4$, respectively. The example of FIG. 3 illustrates the case of an article on a scrolling carrier 201 but is also applicable to the case of an article on a rotating carrier.

In the example of FIG. 3, only 4 lines of light have been shown for the sake of simplicity, but in practice between 8 and 12 lines of light of distinct spectra will preferably be used, to obtain a better determination of the color.

Each line of light has a width $\delta l$. The illuminating strip 20 is generated by the set of all the lines of light and has a width $\Delta l$.

In the example referenced 31, the frequency of formation of the lines is low with respect to the speed of movement. This results in an illuminating strip containing unlit areas of the article.

In the example referenced 32, the frequency of formation of the lines is matched to the speed of movement of the article, such that the lines are juxtaposed pairwise.

In the example referenced 33, the frequency of formation of the lines and/or the optical device for generating the lines of light are/is configured such that the lines are at least partially superposed pairwise. This configuration is not a problem since, in practice, the lines of light are generated one after the other and acquired in a synchronized manner. Thus, the illuminating strip may have a width that will be at least equal to the width of one line of light.

In practice, the detecting device comprising the one or more sensors 102 and the optical device 106 allowing the lines of light to be imaged on the one or more sensors will possibly be configured to allow a line the dimensions of which are at least as large as those of one line of light to be acquired, so as not to decrease the dimensions of the strip actually observed. Thus, an observation strip corresponding to one illuminating cycle, and coincident with the illuminating strip, will possibly be defined. However, if the optical field defined by the detecting device (or "acquisition line") has smaller dimensions than the line of light, an effective observation strip will possibly be defined by the set of all the acquisition lines during one illuminating cycle, or, more generally, by the area common to the sets generated on the one hand by all the illuminating lines and on the other hand by all the acquisition lines. In the remainder of the description however, it will be assumed that the effective observation strip is limited by the illuminating strip.

Thus, during each illuminating cycle, for each dot $P_k$ of the observation strip, the detecting device allows N signals, respectively corresponding to the light backscattered by the article in each of the spectral bands, to be acquired, and on the basis of which signals it will be possible to determine at least one value representative of the color of said dot.

As illustrated for example in schematics 32 and 33 of FIG. 3, a dot $P_k$ has dimensions determined in the direction of movement by the width $\Delta l$ of the observation strip and in the transverse direction (i.e. in the direction X perpendicular to the direction Y of movement), by a dimension $\delta p$ defined by the opto-geometric characteristics of the one or more sensors 102 and of the optical device 105. Thus, for example, for a sensor 102 formed of a linear arrangement of photosensitive elements (or pixels) of given dimensions, the dimension $\delta p$ of a dot $P_k$ will be equal to the dimension of one or more pixel(s) of the sensor, divided by the magnification of the optical device 106. It is then possible to define a resolution of the system in the direction of travel (or longitudinal resolution), which resolution is defined by the width $\Delta l$ of the observation strip, and a resolution of the system in the transverse direction (or transverse resolution), which resolution is defined by the dimension $\delta p$ of a dot $P_k$. Due to the original arrangement of the elements of the system according to the present description, the applicants have shown that it is possible to achieve a longitudinal resolution smaller than 1 mm, and typically of between 0.1 mm and 1 mm, 0.1 mm corresponding to the resolution of a human observer observing at a distance of 30 cm. Advantageously, it will be possible to obtain a longitudinal resolution of between 0.1 mm and 0.5 mm, and typically of around 0.5 mm. The transverse resolution is set by the dimensions of the pixels, but it will in practice possibly be sought to achieve identical longitudinal and transverse resolutions.

Figure 4:
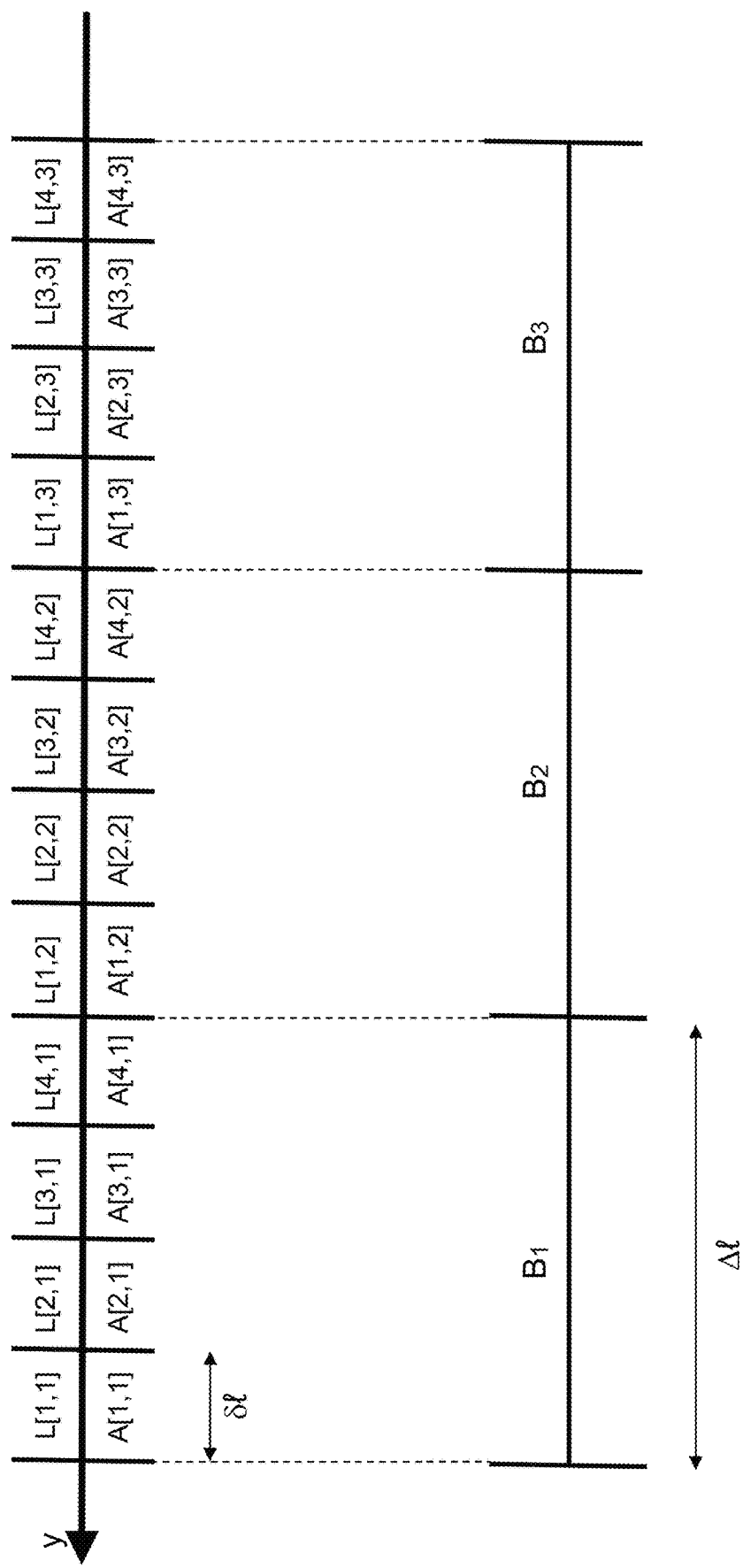
FIG. 4 shows a schematic overview illustrating the formation of the lines of light and the detection of the corresponding light signals, during a given number of illuminating cycles, according to one example of implementation of a color control method according to the present description.

FIG. 4 illustrates, according to one example, the formation of the lines of light and the detection of the corresponding light signals, during a given number of illuminating cycles (in this example 3), according to one example of implementation of a color control method according to the present description.

In this example, 4 lines of light, which are respectively referenced L[1,1], L[2,1], L[3,1] and L[4,1], are generated by means of the illuminating device during a first illuminating cycle. The lines of light all have the same width $\delta l$. As in the example shown in schematic 32 in FIG. 3, the illumination is synchronized with the movement of the carrier by means of the synchronizing unit 103 so that the lines of light are juxtaposed and generate an observation strip $B_1$. The illuminating is moreover synchronized with the detection so that the one or more sensors 102 successively detect each of the lines, this resulting in N acquisition signals referenced A[1,1], A[2,1], A[3,1] and A[4,1] in FIG. 4.

For example, if a given longitudinal resolution $\Delta l$, which corresponds to the width of the observation strip, is sought for the color control system, and if N different spectral bands are employed (in this example N=4), it will be possible to choose an incremental movement $6s$ of the carrier equal to $\Delta l/N$ and to synchronize the movement with the illumination such that, on each movement of the carrier, the article is illuminated with the following line.

The operation is reiterated with a sufficient number of cycles to cover the article the color of which it is being sought to control.

Thus in the example of FIG. 4, the general denotation of the line of light corresponding to color i of cycle j is L[i,j], the general denotation of the acquisition of the light backscattered by the line of light corresponding to color i of cycle j is A[i,j], and the general denotation of the observation strip associated with an illuminating cycle j is Bj.

The detecting device sends, to the processing unit 104, for each dot $P_k$ (see FIG. 3) of an observation strip Bj, a number N of signals $A_k$[i,j] corresponding to the light backscattered by said dot $P_k$ in each of the N spectral bands i of illuminating cycle/From these signals, it is possible to determine at least one value representative of the color of the dot.

For example, the hue angle $h_{ab}$ and the lightness L on the CIE Lab sphere will possibly be determined.

Figure 10:
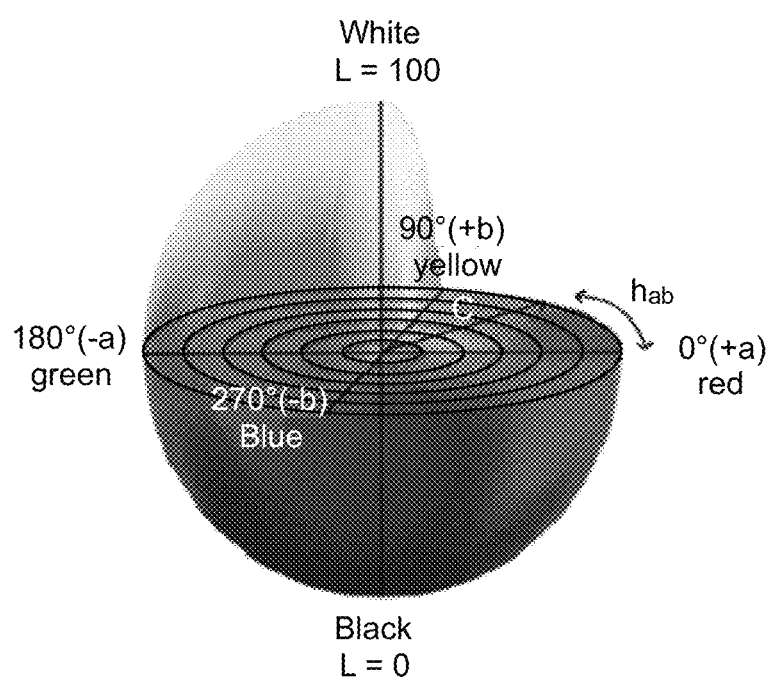
FIG. 10 shows a diagram illustrating the CIE Lab (or "CIE 1976 L*a*b*") sphere adopted by the International Commission on Illumination (CIE) in 1976 and defined according to the standard ISO 11664-4.

By way of reminder, FIG. 10 shows a schematic illustrating the CIE Lab sphere adopted by the International Commission on Illumination (CIE) in 1976 and defined according to the standard ISO 11664-4. The hue angle $h_{ab}$ indicates the color; it changes from red (angle 0°) to yellow (90°) then to green (180°) then to blue (270°). On the sphere, the lightness L is indicated on the y-axis, the colors changing from the lightest (L=100) to the darkest (L=0).

To compute an L*a*b* value from the N measurements of the light energy of each of the bands of the illuminating spectrum, the following steps will possibly be implemented.

As explained above, and for each dot $P_k$ of each observation strip, a spectral reflectance curve of the article, i.e. a curve giving, as a function of wavelength, a value corresponding to the light backscattered, is determined. This reflectance curve is corrected using the light spectrum of the illuminating device, which spectrum is generated from the sum of the light spectra of each source of the illuminating device. From the corrected spectrum, it is possible firstly to compute the "absolute" color in the CIE (1931) XYZ space defined by the standards ISO/CIE 11664-3:2019 and ISO/CIE 11664-4:2019, then subsequently to deduce the perceived color in the CIE (1976) Lab space.

According to one or more examples of embodiment, it is also possible to increase color accuracy, at the cost of a loss in longitudinal resolution, by averaging the acquisitions A[i,j] and A[i,j+1] of two lines of light of the same color i but of two consecutive strips $B_1$ and $B_{j+1}$.

Thus, it will be possible to determine an acquisition signal $A'_k[i,j]$ of a dot $P_k(j)$ of an observation strip Bj using the following formula:

$$A'_k[i, j] = \frac{N-i}{N} A_k[i, j] + \left(1 - \frac{N-i}{N}\right) A_k[i, j+1] \quad \text{[Math 1]}$$

This formula gives, in a simplified example of illumination comprising 4 strips of colors (N=4) and therefore with i varying from 0 to 3:

[Math 2]

$A'k[0,j]=1*Ak[0,j]+0*Ak[0,j+1]$      Color 1

[Math 3]

$A'k[1,j]=¾*Ak[1,j]+¼*Ak[1,j+1]$      Color 2

[Math 4]

$A'k[2,j]=½*Ak[2,j]+½*Ak[2,j+1]$      Color 3

[Math 5]

$A'k[3,j]=¼*Ak[3,j]+¾*Ak[3,j+1]$      Color 4.

Generally, the synchronizing unit 103 and the processing unit 104 to which reference is made in the present description may be comprised in one or more physical entities, for example one or more computers or circuit boards.

When, in the present description, reference is made to computing or processing steps, especially with respect to implementation of method steps, it will be understood that each computing or processing step may be implemented by software, hardware, firmware, microcode, or any appropriate combination of these technologies. When software is used, each computing or processing step may be implemented via computer-program instructions, software code or programmable logic. These instructions may be stored in or transmitted to a storage medium readable by the synchronizing unit and/or the processing unit and/or be executed by the synchronizing unit and/or the processing unit in order to implement these computing or processing steps.

Figure 5A:
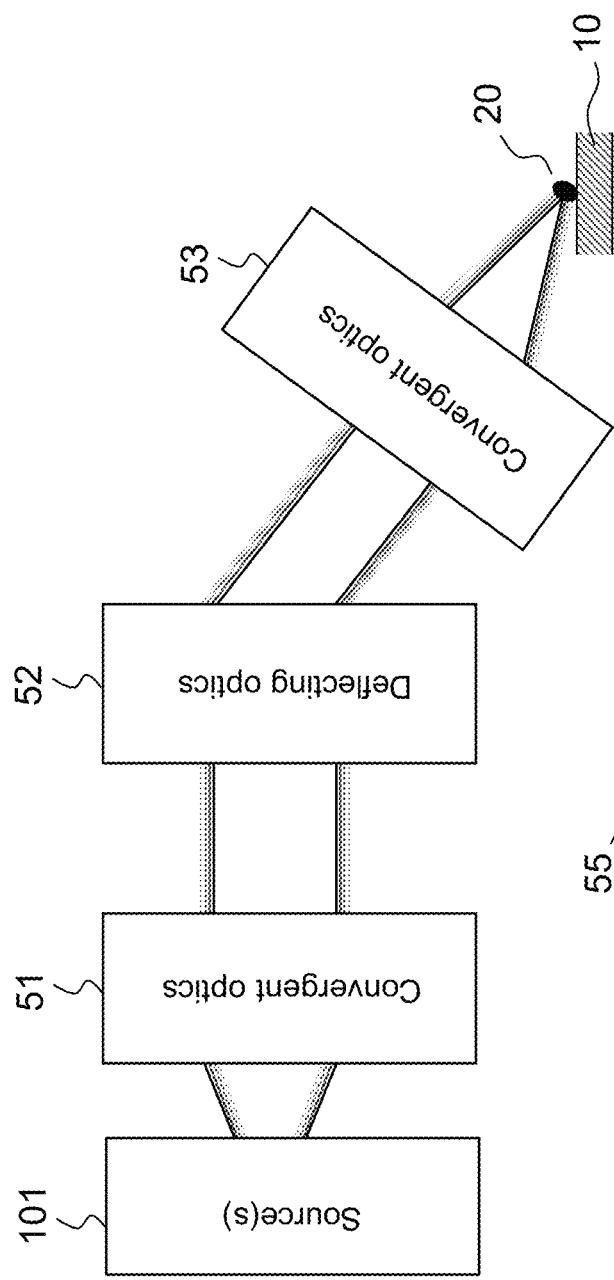
FIG. 5A shows a functional schematic of an example of a lighting device in a color control system according to the present description.
Figure 5B:
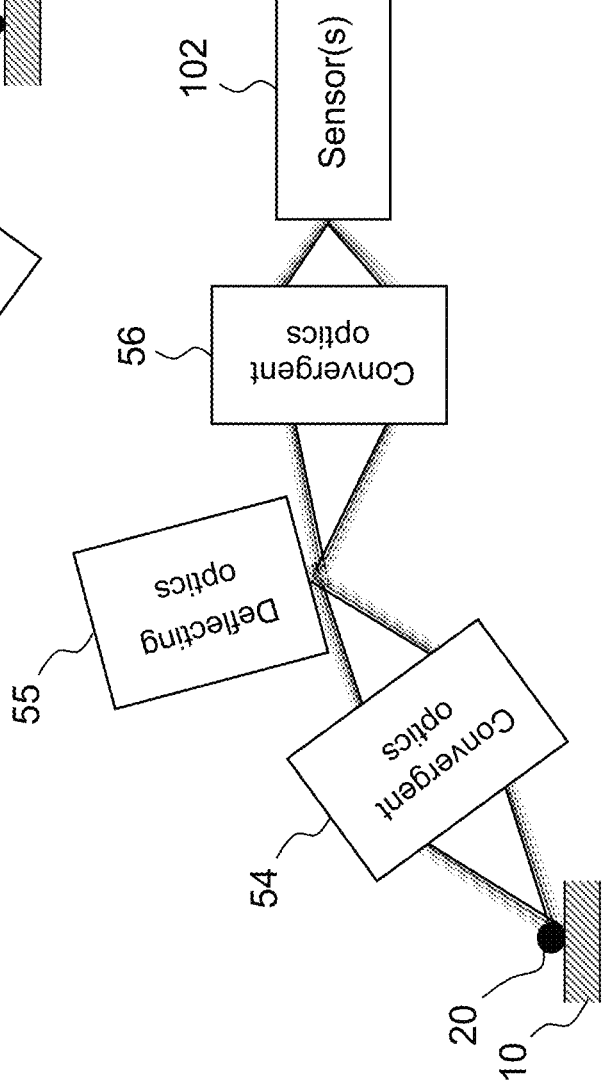
FIG. 5B shows a functional schematic of an example of a detecting device in a color control system according to the present description.

FIG. 5A shows a functional schematic of an example of a lighting device in a color control system according to the present description and FIG. 5B shows a functional schematic of an example of a detecting device.

One objective of the illuminating device such as shown in FIG. 5A is to increase the uniformity of the illumination and to concentrate it to generate lines of light that are of the desired dimensions and sufficiently bright. It thus comprises, in addition to the one or more sources 101, convergent optics 51, 53 and deflecting optics 52.

Figure 6:
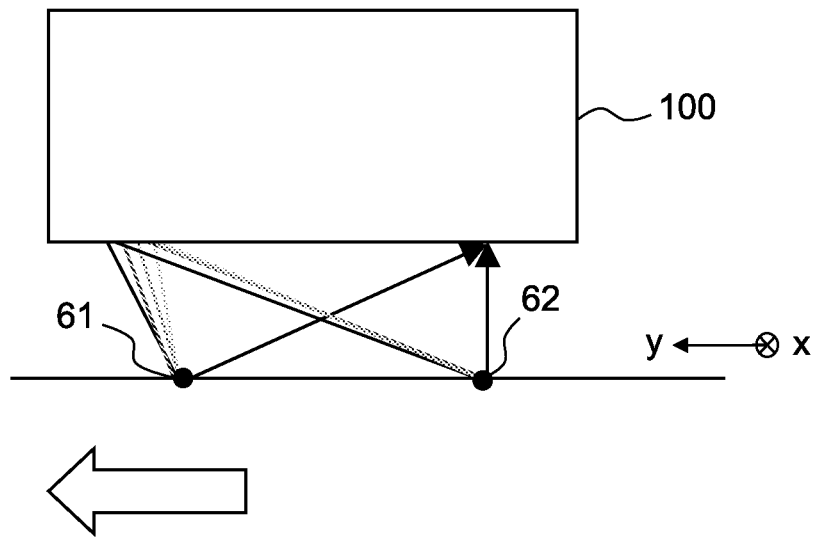
FIG. 6 shows a functional schematic of examples of a color control system according to the present description, with two examples of illumination and detection, respectively.

The convergent optics 54, 56 and deflecting optics 55 of the detecting device illustrated in FIG. 5B make it possible to generate, on the one or more sensors 102, which are for example linear CMOS or CCD cameras, images of the lines of light. FIG. 6 shows a functional schematic of examples of a color-controlling system according to the present description, with two configurations of illumination and detection allowing observation strips, referenced 61 and 62, to be generated, respectively.

The configuration that allows the observation strip 62 to be generated corresponds to illumination at an angle of about 45° and to detection in a plane substantially perpendicular to the carrier (0-45 geometry). This standardized configuration only allows scattered light to be measured. The configuration that allows the observation strip 61 to be generated corresponds to illumination at substantially normal incidence and detection at about 45°. This configuration also allows some of the specularly reflected radiation to be measured.

Figure 7:
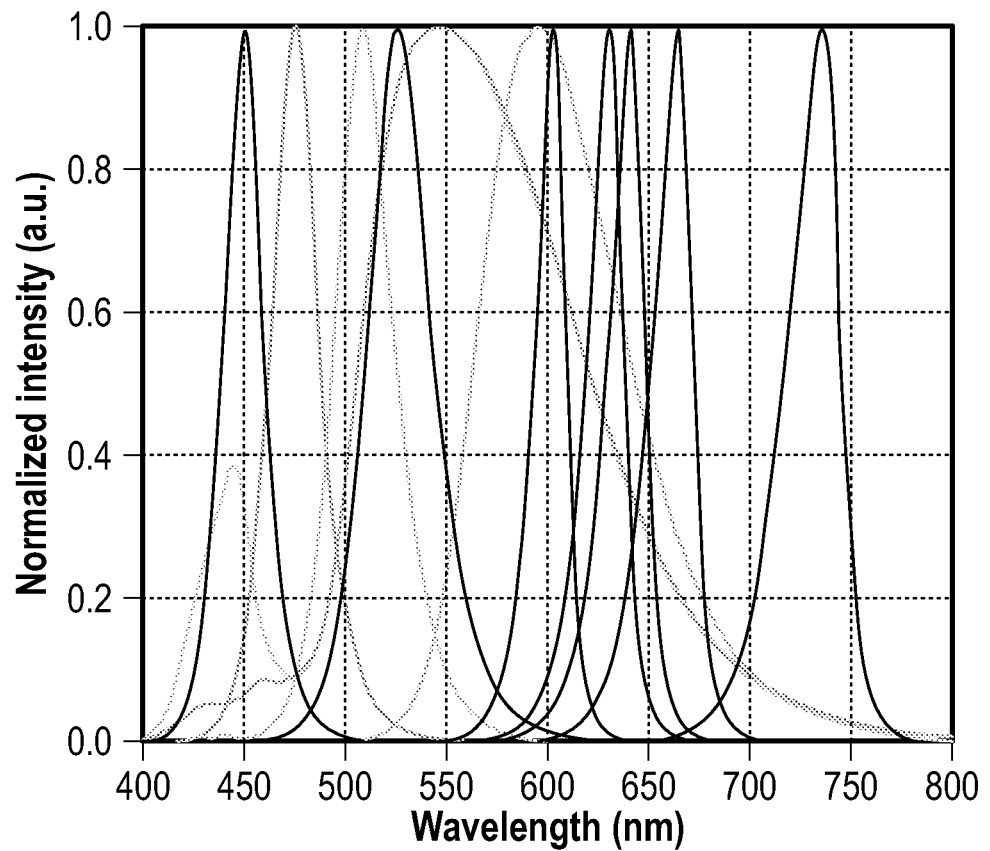
FIG. 7 shows curves of spectra (normalized intensity as a function of wavelength) of lines of light, according to one example of implementation of a color control method according to the present description.

FIG. 7 shows spectra (curves of normalized intensity as a function of wavelength) of lines of light, according to one example of implementation of a color control method according to the present description.

The lines of light are obtained for example by means of LEDs. Controlling independently the emission power of each LED allows any type of illumination, whether standardized (D50, D65, etc.) or not, to be modelled via a simple choice of parameters. The juxtaposition of the emission spectra of the LEDs makes it possible to cover all the frequencies of the visible spectrum and to obtain, as regards the color control, a very good accuracy.

Table 1 below thus illustrates, by way of example, 12 types of LED the spectra of which overlap.

TABLE 1

| Colors | Frequency Max | Band |
| --- | --- | --- |
| 1. Violet | 440 | 420-445 |
| 2. Dark blue | 460 | 440-465 |
| 3. Blue | 475 | 460-480 |
| 4. Cyan | 500 | 485-515 |
| 5. Green | 530 | 510-550 |
| 6. Light green | 550 | 530-565 |
| 7. Lime | 560 | 545-575 |
| 8. Amber | 590 | 580-600 |
| 9. Orange | 610 | 595-625 |
| 10. Red | 630 | 620-640 |
| 11. Bright red | 670 | 660-680 |
| 12. Far Red | 735 | 720-750 |

One objective of the illumination is, for example, to produce, from incoherent sources, a strip of light that is as uniform as possible in the transverse direction and that is concentrated enough in the direction of travel (or direction of movement) to increase luminous power and improve the accuracy of the color control.

Figure 8:
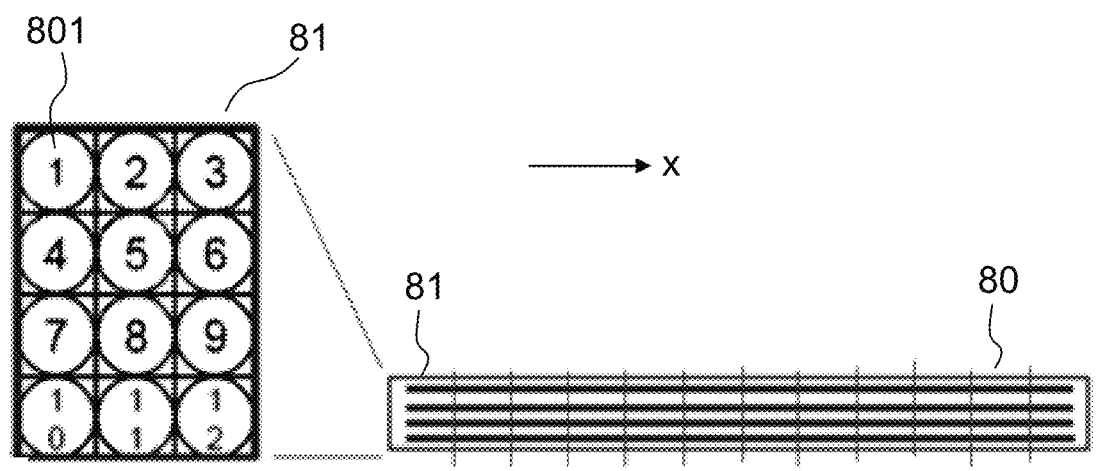
FIG. 8 shows a functional schematic of an example of a light source in a color control system according to the present description.

A set of light sources, one example of which is shown in FIG. 8, may be used.

In this example, the light sources, which are for example the LEDs the spectra of which are shown in FIG. 7, are point sources that have been combined to generate a matrix array 80. The matrix array 80 comprises a set 81 of cells, each cell comprising one of each of the illuminating sources 801, which in this example are 12 in number. Thus, in the example of FIG. 8, the light sources are distributed, in each module, in a matrix array of 3 columns and 4 rows.

When generating a line of light i, all the point sources i of the various modules are turned on, this allowing illumination to be achieved, in the corresponding spectral band, that is uniform over the entire area to be illuminated.

It will be noted that it is also possible to distribute the point light sources randomly in the matrix array of each of the modules to further increase the uniformity of the illumination.

Figure 9:
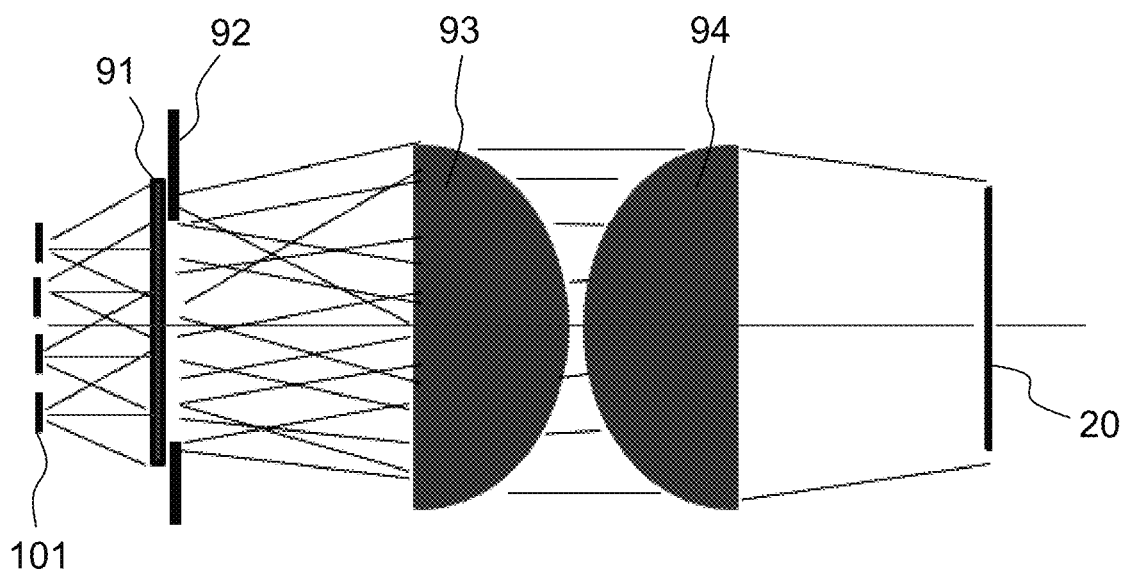
FIG. 9 shows a functional schematic of an example of a lighting device in a color control system according to the present description.

FIG. 9 shows a functional schematic seen in section of an example of an illuminating device in a color-controlling system according to the present description, in a 0-45 geometry (illumination at 45° with respect to the surface). The illuminating device comprises, in addition to the sources 101, a diffuser 91. A shutter 92 has been added after the diffuser to decrease the angle on the concentrating device, which consists of two inverted semi-cylindrical lenses 93, 94 of same focal length.

Although described by way of a certain number of examples of embodiment, the color-controlling systems and methods according to the present description comprise various variations, modifications and improvements that will appear obvious to those skilled in the art, and it will be understood that these various variants, modifications and improvements form part of the scope of the invention such as defined by the following claims.

The invention claimed is:

1. A color control system for controlling, in real time, the color of an article positioned on a carrier moving in a given direction of movement, comprising:
   an illuminating device configured to illuminate said moving article in successive illuminating cycles, each illuminating cycle comprising successively generating, at a given frequency, a given number N of lines of light having distinct spectral bands, N≥4, said lines of light being substantially perpendicular to the direction of movement, the set of N lines of light generated during an illuminating cycle defining, on the moving article, an illuminating strip of given dimension in the direction of movement;
   a detecting device configured to detect, during each illuminating cycle, the light backscattered by the article successively illuminated by each of said lines of light, so as to generate, during each illuminating cycle, for each dot of a number of given dots of an observation strip perpendicular to the direction of movement, a number N of signals corresponding to the light backscattered by said dot in each of the spectral bands, respectively;
   a processing unit configured to determine, for each of the dots of the observation strip and on the basis of said N signals, at least one value representative of the color of said dot.

2. The color control system as claimed in claim 1, wherein the number N of lines of light of distinct spectral bands is comprised between 8 and 12.

3. The color control system as claimed in claim 1, wherein the illuminating device comprises a plurality of light sources configured to successively emit one or more beams in each of said spectral bands, and one or more optical elements configured to generate, from said one or more beams emitted in each of said spectral bands, a line of light in said spectral band.

4. The color control system as claimed in claim 1, wherein a dimension of the observation strip in a direction parallel to the direction of movement is comprised between about 0.1 mm and about 1 mm.

5. The color control system as claimed in claim 1, wherein the detecting device comprises at least one fixed sensor and one or more optical elements configured to generate, during each cycle, an image of each line of light backscattered by the article on said sensor.

6. The color control system as claimed in claim 5, wherein said at least one fixed sensor is monochrome.

7. A color control method for controlling the color of an article on a carrier moving in a given direction, comprising:
   illuminating the moving article, by means of an illuminating device and in successive illuminating cycles, each illuminating cycle comprising successively generating, at a given frequency, a given number N of lines of light having distinct spectral bands, N≥4, said lines of light being substantially perpendicular to the direction of movement, the set of N lines of light generated during an illuminating cycle defining, on the moving article, an illuminating strip of given size in the direction of movement;
   detecting, by means of a detecting device, during each illuminating cycle, the light backscattered by the article successively illuminated by each of said lines of light, so as to generate, during each illuminating cycle, for each dot of a number of given dots of an observation strip perpendicular to the direction of movement, a number N of signals corresponding to the light backscattered by said dot in each of the spectral bands, respectively;
   determining, for each of the dots of the observation strip and on the basis of said N signals, at least one value representative of the color of said dot.

8. The color control method as claimed in claim 7, wherein said at least one value representative of the color comprises a color difference determined with respect to a reference object.

9. The color control method as claimed in claim 7, wherein the determination of said at least one value representative of the color comprises a step of computing the weighted average of signals acquired via detection of a plurality of lines of light of same spectral band in consecutive illuminating cycles.

10. The color control method as claimed in claim 7, further comprising a prior step of calibrating the detecting device.

* * * * *